(12) United States Patent
Christmas et al.

(10) Patent No.: US 8,159,733 B2
(45) Date of Patent: Apr. 17, 2012

(54) METHOD OF FORMING AN IMAGE AND IMAGE PROJECTION DEVICE

(75) Inventors: Jamieson Christmas, Milton (GB); Neil Collings, Linton (GB); Andreas Georgiou, Larnaca (CY)

(73) Assignee: Cambridge Enterprise Limited, Cambridge, Cambridgeshire (GB)

( * ) Notice: Subject to any disclaimer, the term of this patent is extended or adjusted under 35 U.S.C. 154(b) by 575 days.

(21) Appl. No.: 12/291,011

(22) Filed: Nov. 5, 2008

(65) Prior Publication Data

US 2009/0128872 A1    May 21, 2009

Related U.S. Application Data

(63) Continuation of application No. PCT/EP2007/003962, filed on May 4, 2007.

(30) Foreign Application Priority Data

May 11, 2006   (GB) .................................. 0609366.0

(51) Int. Cl.
*G03H 1/08* (2006.01)
*G02B 27/46* (2006.01)

(52) U.S. Cl. ............................................. 359/9; 359/562
(58) Field of Classification Search ............... 359/9, 562
See application file for complete search history.

(56) References Cited

U.S. PATENT DOCUMENTS

| | | |
|---|---|---|
| 3,016,417 A | 1/1962 | Mast et al. |
| 3,233,040 A | 2/1966 | Crane |
| 5,515,183 A * | 5/1996 | Hashimoto ........................ 359/9 |
| 6,917,355 B1 * | 7/2005 | Fergason ....................... 345/107 |

FOREIGN PATENT DOCUMENTS

| | | |
|---|---|---|
| EP | 1498766 A1 | 1/2005 |
| EP | 1731255 A9 | 6/2007 |
| GB | 1 202 562 A | 8/1970 |
| JP | 02 101424 | 4/1990 |
| JP | 06176409 A | 12/1992 |
| JP | 2007093947 A | 4/2007 |
| WO | WO99/32921 A | 7/1999 |
| WO | WO 01/48531 A | 7/2001 |
| WO | WO 03/021341 A | 3/2003 |

OTHER PUBLICATIONS

Gerhard-Multhaupt, R., et al., "Viscoelastic Spatial Light Modulators and Schlieren-Optical Systems for HDTV Projection Displays," Proceedings of the SPIE, SPIE, Bellingham, VA, vol. 1255, pp. 69-78 (Feb. 14, 1990).

Roder, H., et al., "Full colour diffraction-based optical system for light-valve projection displays," Displays, (16(1): 27-33 (Elsevier Science Publishers BV), (1995). (month of publication not available).

(Continued)

*Primary Examiner* — Alessandro Amari
(74) *Attorney, Agent, or Firm* — Hamilton, Brook, Smith & Reynolds, P.C.

(57) ABSTRACT

A method of forming an image comprising providing a device for imparting respective phase shifts to different regions of an incident wavefront, wherein the phase shifts give rise to an image in a replay field, and causing zero-order light to be focused into a region between the replay field and the device.

14 Claims, 1 Drawing Sheet

OTHER PUBLICATIONS

Horsky, T.N., et al., "Electron-beam-addressed membrane mirror light modulator for projection display," *Applied Optics*, 31(20): 3980-3990 (Jul. 10, 1992).

Fritsch, M., et al., A Liquid-Crystal Phase Modulator for Large Screen Projection, IEEE Transactions on Electron Devices, 36(9): 1882-1887, (Sep. 1, 1989).

International Search Report, PCT/EP2007/003962, (Aug. 8, 2007).

Great Britain Search Report, GB0609366.0, (Sep. 20, 2007).

Cable, A.J., et al., "53.1: Real-Time Binary Hologram Generation for High-Quality Video Projection Applications," *SID 04 Digest*, pp. 1431-1433 (2004).

\* cited by examiner

METHOD OF FORMING AN IMAGE AND IMAGE PROJECTION DEVICE

RELATED APPLICATION

This application is a Continuation of International Application No. PCT/EP2007/003962, which designated the United States and was filed on May 4, 2007, published in English, and claims priority under 35 U.S.C.§119 or 365 to Great Britain Application No. 0609366.0, filed May 11, 2006.

The entire teachings of the above applications are incorporated herein by reference.

SUMMARY OF THE INVENTION

The present invention relates to a method of blocking zero-order light from the replay field of a device exhibiting respective phase shifts so as to image by diffraction, and to method of projecting an image using diffractive techniques.

Image projection using light passing through kinoforms, and through spatial light modulators simulating dynamic kinoforms is a subject of interest for a number of reasons. One of the advantages of such imaging is that the technique can be highly efficient since much of the light used to irradiate the kinoform finds its way to the replay field.

In this patent document, the pattern of phase distributions will be referred to, for simplicity, as a hologram, without intended limitation. Again without limitation, the techniques discussed find application to two-dimensional video projection systems. In one system, target image data is picked up by a pixilated sensor, and phase information is retrieved from the data in real-time, the phase information being applied to a suitable device, which is then illuminated with, for example, laser light to create a replay field representing the target image. In another system, the phase information is read from a storage medium storing this information in pre-recorded form. In yet another system, the phase information is computer-generated (i.e. without any "real" target image).

There is, however, a difficulty with phase-reproducing devices such as pixilated spatial light modulators in that they exhibit well-known problems of zero-order light. Such zero-order light can be regarded as "noise" and includes for example specularly reflected light, and other light that is unrefracted by the patterns on the spatial light modulator.

Some embodiments of this invention are founded upon modifying data that is applied to a spatial light modulator (SLM) so that a replay field is provided at a location beyond a region where zero-order light is caused to converge.

Other embodiments are founded upon providing physical means for causing the replay field to be provided at a location beyond a region where zero-order light is caused to converge. Such physical means may consist for example of shaping the SLM substrate, or providing a further diffractive means (such as for example an additional layer in the SLM, or a further SLM).

According to a first aspect of the invention there is provided a method of forming an image comprising providing a device for imparting respective phase-shifts to different regions of an incident wavefront, wherein the phase shifts give rise to an image in a replay field, and causing zero-order light to be focused into a region between the replay field and the device.

The method may comprise blocking the zero-order light from passing from the region to the replay field.

The method may comprise providing imaging data corresponding to phase shifts that would, if subjected to a collimated incident beam, provide an image in a replay field located substantially in the focal plane of a Fourier lens disposed in the exit path of the device, and processing the imaging data, so that the replay field would be displaced beyond the focal plane.

The method may comprise providing a said device having a substrate shaped to cause imaging light to form a replay field beyond a zero-order focal region.

The device may be transmissive, and the method may comprise modifying phase shifts to be displayed on the device to take into account respective different phase shifts imparted by a device substrate to light passing therethrough.

The method may comprise providing a first device for displaying imaging phase shifts and providing a second device for imparting sphericality to diffracting light leaving the first device.

According to a second aspect of the invention there is provided a method of forming an image in a replay field of a device carrying a distribution of phase information, the method comprising causing the phase information to impart a spherical characteristic onto image-representative phase information, illuminating the device with collimated light, and focusing zero order light from the device at a focus, whereby the spherical characteristic causes the replay field to be beyond the focus.

The method may include tiling phase information onto the device.

The device may be a spatial light modulator.

The spatial light modulator may be electrically-addressed.

The spatial light modulator may be a liquid crystal on silicon (LCOS) SLM.

The spatial light modulator may include a store holding data representative of the spherical characteristic information.

The spatial light modulator may be reflective.

According to a third aspect of the present invention there is provided a method of projecting an image, the method comprising writing data to a spatial light modulator, illuminating the spatial light modulator with collimated lights so that the spatial light modulator provides generally-collimated output beam, applying the output beam to a converging lens so that zero-order light undiffracted by the SLM is focused at a first location, wherein the data written to the SLM comprises image data, characterized in that the data written to the spatial light modulator further comprises data for causing the image to be formed beyond the first location.

According to a fourth aspect of the present invention there is provided a method of projecting an image, the method comprising writing data to a spatial light modulator, illuminating the spatial light modulator with light so that the spatial light modulator provides an output beam, applying the output beam to a Fourier lens, whereby light undiffracted by the SLM is focused substantially at the focus of the Fourier lens, wherein the data written to the spatial light modulator comprises phase data retrieved from a target image, the image data being modified so that in concert with the Fourier lens the image content of the output beam forms a replay field beyond the focus of the Fourier lens.

According to a fifth aspect of the present invention there is provided a method for blocking zero-order light from a replay field, comprising providing a pixilated device with a phase distribution that when illuminated would provide a holographic image at a replay plane via a Fourier lens and which phase distribution causes the replay plane to be located beyond the focus of the Fourier lens, and providing a device preventing light from the focus of the Fourier lens from reaching the replay plane.

The device preventing light from the focus of the Fourier lens from reaching the replay plane may comprise a light block. The device preventing light from the focus of the Fourier lens from reaching the replay plane may comprise a mirror.

BRIEF DESCRIPTION OF THE DRAWINGS

Embodiments of the invention will now be described, by way of example, only to assist in understanding the invention. Reference is also directed to the accompanying drawings, in which.

DETAILED DESCRIPTION OF THE INVENTION

Figure 1:
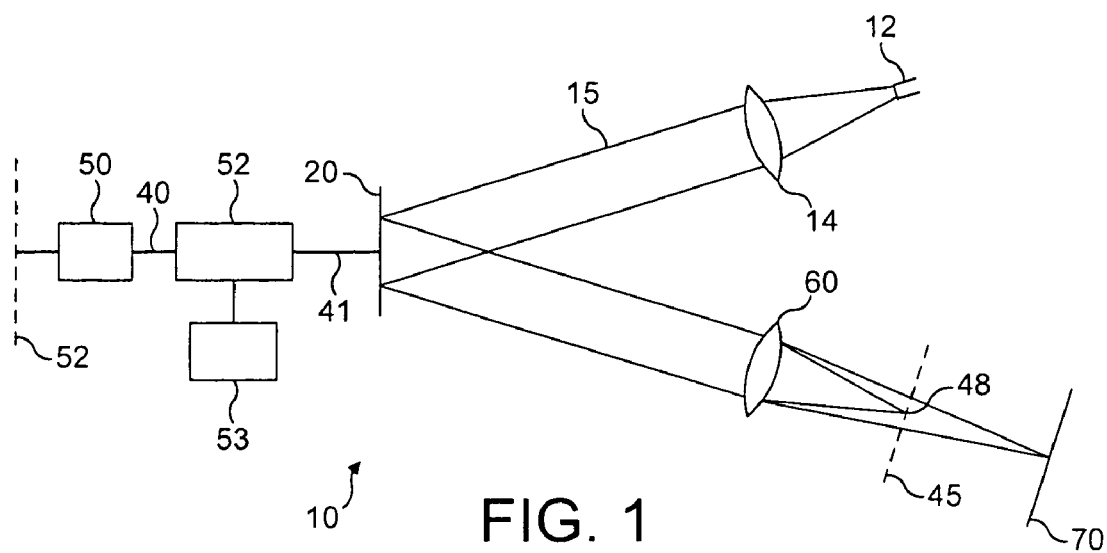
FIG. 1 shows a first embodiment of a projection system.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

A description of example embodiments of the invention follows.

Referring to FIG. 1, an optical projection system 10 has a laser 12 disposed at the focus of a first collimating lens 14 so as to provide a collimated laser light beam 15 onto a liquid crystal on silicon spatial light modulator 20, configured as a phase-only non-binary pixilated SLM. Light from the beam is reflected at the SLM 20 and the exit beam 16 passes into a Fourier lens 60 disposed to intercept the exit beam 16. A light block 48 is disposed in the Fourier plane of the lens 60, and a screen 70 is disposed beyond the light block to form a replay field, as will be later described herein.

Phase data, referred to hereinafter as "image data" 40 is derived, using a processor 50 running a known algorithm from an image sensor 52 sensing a target image (not shown). The image data is a representative of a spatial distribution of phase data which, when corresponding phase shifts are applied to a suitable light beam will reproduce a two-dimensional image substantially corresponding to the target image in a replay field via suitable optics. In the present embodiment the light beam is the collimated beam 15, and the optics comprises the Fourier lens 60.

In this embodiment, the image data 40 is input to a further processing block 52 that serves to modify the image data 40 to provide modified image data 41 to the SLM 20. This is so that the SLM 20 will additionally provide a lensing effect. Use of SLMs to act as lenses is described, for example, in EP-A-14662148. Data for lensing is, in this embodiment, held in a store 53. The lensing effect achieved here is to provide a spherical characteristic. Thus the data that is supplied to the pixels, or phase elements, of the SLM 20 can be regarded as having two components, an image data component and a lensing data component.

As previously noted, the effect of the image data component would normally be to provide a replay field at the focal plane of the Fourier lens 60 when illuminated by collimated light beam 15. However the effect of the lensing data component providing the spherical characteristic may be regarded as analogous to diverging the light that would otherwise form the image at the focal plane. The result of this is to displace the replay field further from the lens 60 to screen 70 so that the replay field is generally aligned behind or beyond the position where the replay field would be if no spherical lensing component were present.

Zero-order light that is undiffracted by the SLM 20 will continue to be converged toward to a focus by the Fourier lens 60 at or substantially at the focal plane 45 of the Fourier lens 60.

To ensure that the zero-order light that has been focused to the location 45 does not reach the imaging plane the light block 48 forms a barrier at or about the position 45 and in FIG. 1 this is provided by a light block 48. The light block in one embodiment is a transparent slide with a dark spot on it. The slide may be adjusted empirically to find the location at which the zero-order light is best blocked. The size of the spot may again be determined empirically.

Figure 2:
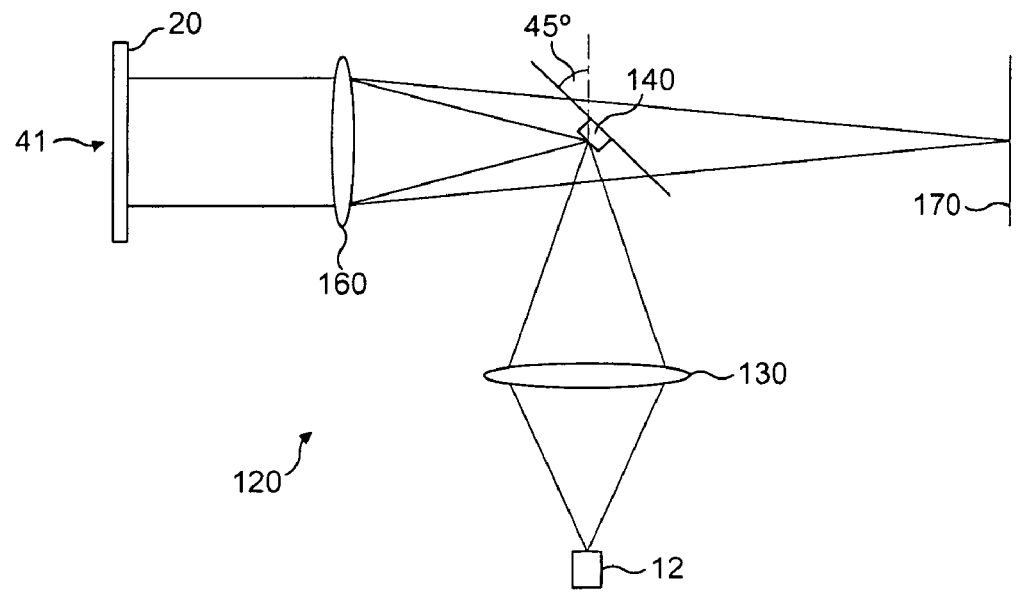
FIG. 2 shows a second embodiment of a projection system.

Turning to FIG. 2, a second projection system 120 operates generally similarly to the first embodiment 10. Light from the laser 12 is focused by a lens 130 onto a reflecting device 140—here a mirror, but in other embodiments a prism is used—which reflecting device is disposed at 45° to the axis of the optical system of the laser. Light is then reflected towards a lens 160 having its focal point at the reflecting device so that collimated light is provided to the SLM 20. The SLM 20, just as in the embodiment of FIG. 1, is reflective and is supplied with information similar to the information of FIG. 1. As a result, the zero-order light is returned to the reflecting device whereas the imaging information is provided at an imaging plane 170 disposed beyond the reflective device.

Although in the embodiments shown the SLM 20 is a reflective device it would alternatively be possible to provide arrangements in which a transmissive modulator is used. Where the device is transmissive, the substrate is likely to have areas of different thickness and/or optical density and these will exert different phase shifts on light being transmitted. This may be accounted for by modifying phase shifts to be displayed on the device to take into account respective different phase shifts imparted by the device substrate to light passing therethrough.

In the above describe embodiments, the "lensing" data are applied by an external processor. However, in other embodiments SLMs having on-board processing are used, and storage local to the SLM, or integrated with the SLM, holds the lensing data.

A number of other embodiments exist. For example, in one family of embodiments a standing lensing pattern is provided by a layer overlying the liquid crystal layer.

In the above embodiments, the phase distribution is provided by addressing elements and illuminating the pixels of the SLM itself. It is alternatively possible to use data written to the SLM to write data to an optically addressed special light modulator (OASLM), and then to illuminate the OASLM to provide the image-producing light. In one embodiment, the LCOS SLM has fan-out optics and data from the LCOS SLM is used to tile onto the OASLM.

The described embodiment is in the field of video image projection. The invention is not however so restricted.

Relevant teachings from references cited herein are hereby incorporated by reference.

While this invention has been particularly shown and described with references to example embodiments thereof, it will be understood by those skilled in the art that various changes in form and details may be made therein without departing from the scope of the invention encompassed by the appended claims.

What is claimed is:

1. A method of forming an image comprising providing a device for imparting respective phase-shifts to different regions of an incident wavefront, wherein the phase shifts give rise to an image in a replay field, and causing zero-order light to be focused into a region between the replay field and the device.

2. A method according to claim 1, comprising blocking the zero-order light from passing from the region to the replay field.

3. A method according to claim 1, comprising providing imaging data corresponding to respective phase shifts that would, if subjected to a collimated incident beam, provide an image in a replay field located substantially in the focal plane of a Fourier lens disposed in the exit path of the device, and processing the imaging data, so that the replay field would be displaced beyond the focal plane.

4. A method according to claim 1, comprising providing a said device having a substrate shaped to cause imaging light to form a replay field beyond a zero-order focal region.

5. A method according to claim 1, wherein the device is transmissive, and further comprising modifying phase shifts to be displayed on the device to take into account respective different phase shifts imparted by a device substrate to light passing therethrough.

6. A method according to claim 1, comprising providing a first device for
   displaying imaging phase shifts and
   providing a second device for imparting sphericality to diffracting light leaving the first device.

7. A method according to claim 1, comprising tiling phase information onto the device.

8. A method according to claim 1, wherein the device is a spatial light modulator.

9. A method of forming an image in a replay field of a device carrying a distribution of phase information, the method comprising causing the phase information to impart a spherical characteristic onto image-representative phase information, illuminating the device with collimated light, and focusing zero order light from the device at a focal region, whereby the spherical characteristic causes the replay field to be beyond the focal region.

10. A method according to claim 9, wherein the replay field and the focal region are generally on a common axis.

11. A method of projecting an image, the method comprising writing data to a spatial light modulator, illuminating the spatial light modulator with collimated lights so that the spatial light modulator provides generally-collimated output beam, applying the output beam to a converging lens so that zero-order light undiffracted by the SLM is focused at a first location, wherein the data written to the SLM comprises image data, characterized in that the data written to the spatial light modulator further comprises data for causing the image to be formed beyond the first location.

12. A method of projecting an image, the method comprising writing data to a spatial light modulator, illuminating the spatial light modulator with light so that the spatial light modulator provides an output beam, applying the output beam to a Fourier lens, whereby light undiffracted by the SLM is focused substantially at the focus of the Fourier lens, wherein the data written to the spatial light modulator comprises phase data retrieved from a target image, the image data being modified so that in concert with the Fourier lens the image content of the output beam forms a replay field beyond the focus of the Fourier lens.

13. A method for blocking zero-order light from a replay field, comprising providing a pixilated device with a phase distribution that when illuminated would provide a holographic image at a replay plane via a Fourier lens and which phase distribution causes the replay plane to be located beyond the focus of the Fourier lens, and providing a device preventing light from the focus of the Fourier lens from reaching the replay plane.

14. An image projection device comprising a device for imparting respective phase-shifts to different regions of an incident wavefront, wherein the phase shifts give rise to an image in a replay field, and means for causing zero-order light to be focused into a region between the replay field and the device.

* * * * *